US008908682B2

(12) United States Patent
Ghosh et al.

(10) Patent No.: US 8,908,682 B2
(45) Date of Patent: *Dec. 9, 2014

(54) SWITCH DISCOVERY PROTOCOL FOR A DISTRIBUTED FABRIC SYSTEM

(75) Inventors: Nirapada Ghosh, Sunnyvale, CA (US); Keshav Govind Kamble, Fremont, CA (US); Dar-Ren Leu, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/364,947

(22) Filed: Feb. 2, 2012

(65) Prior Publication Data

US 2013/0201983 A1    Aug. 8, 2013

(51) Int. Cl.
*H04L 12/50* (2006.01)

(52) U.S. Cl.
USPC ........................................... 370/357

(58) Field of Classification Search
USPC ........... 370/254, 357, 401; 709/220, 227, 253
See application file for complete search history.

(56) References Cited

U.S. PATENT DOCUMENTS

| 5,563,876 | A | 10/1996 | Duxbury et al. |
| 6,563,832 | B1 | 5/2003 | Stuart et al. |
| 6,779,039 | B1 | 8/2004 | Bommareddy et al. |
| 6,856,591 | B1 | 2/2005 | Ma et al. |
| 6,952,421 | B1* | 10/2005 | Slater ............................ 370/401 |
| 7,171,491 | B1* | 1/2007 | O'Toole et al. ............... 709/244 |
| 7,653,735 | B2* | 1/2010 | Mandato et al. .............. 709/231 |
| 7,925,722 | B1* | 4/2011 | Reed et al. .................... 709/220 |
| 2002/0159446 | A1* | 10/2002 | Foster et al. ................... 370/357 |
| 2004/0030766 | A1* | 2/2004 | Witkowski .................... 709/223 |
| 2006/0268782 | A1 | 11/2006 | Kwak et al. |
| 2008/0267175 | A1* | 10/2008 | Mo et al. ....................... 370/357 |
| 2008/0291843 | A1 | 11/2008 | Sonnenberg et al. |
| 2009/0016346 | A1* | 1/2009 | Tang et al. .................... 370/390 |
| 2009/0198836 | A1* | 8/2009 | Wittenschlaeger ........... 709/253 |
| 2009/0228418 | A1* | 9/2009 | Ramesh et al. ................ 706/46 |
| 2010/0180322 | A1* | 7/2010 | Finn et al. ....................... 726/4 |
| 2010/0182934 | A1* | 7/2010 | Dobbins et al. ............... 370/254 |
| 2011/0055276 | A1* | 3/2011 | Hamilton et al. ............. 707/784 |
| 2012/0089740 | A1* | 4/2012 | Yin et al. ....................... 709/227 |
| 2013/0163591 | A1 | 6/2013 | Shukla et al. |

OTHER PUBLICATIONS

"Discovering Network Connectivity Among Network Devices Based on Topological Information", Ip.com, Feb. 27, 2007, 25 pages.

(Continued)

*Primary Examiner* — Chirag Shah
*Assistant Examiner* — Jael Ulysse
(74) *Attorney, Agent, or Firm* — Schmeiser, Olsen & Watts LLP; Michael Rodriguez

(57) ABSTRACT

A distributed fabric system comprises a plurality of independent network elements interconnected by inter-switch links and assigned to a same group. Each network element includes one or more switching chips, a processor, and memory storing program code that is executed by the processor. The program code of each network element includes a switch discovery protocol (SDP) module. The SDP module of each network element, when executed, periodically multicasts SDP data units (SDPDUs) using one of a plurality of transmission rates. The plurality of transmission rates includes a fast transmission rate and a slow transmission rate. The transmission rate used by the SDP module of each network element is the fast transmission rate until the SDP module of that network element determines a criterion is met, in response to which the transmission rate used by the SDP module of that network element changes to the slow transmission rate.

16 Claims, 9 Drawing Sheets

(56) References Cited

OTHER PUBLICATIONS

Le Roux, et al., "IS-IS Protocol Extensions for Path Computation Element (PCE) Discovery (RFC5089)", Ip.com, Jan. 1, 2008, 26 pages.
Non-Final Office Action in related U.S. Appl. No. 13/454,120, mailed on Dec. 4, 2013; 15 pages.
Final Office Action in related U.S. Patent Application No. 13/454,120, mailed on Jun. 13, 2014; 17 pp.
Notice of Allowance in related U.S. Patent Application No. 13/454,120, mailed on Aug. 28, 2014, 8 pp.
Examination Report in related United Kingdom patent application no. 1412785.6, mailed on Aug. 15, 2014; 4 pp.
Examination Report in related United Kingdom patent application no. 1412785.6, mailed on Sep. 1, 2014; 2 pp.

\* cited by examiner

SWITCH DISCOVERY PROTOCOL FOR A DISTRIBUTED FABRIC SYSTEM

FIELD OF THE INVENTION

The invention relates generally to data centers and data processing. More particularly, the invention relates to a protocol for detecting when switches join and leave a distributed fabric system and for determining a best available path for communication between switches in the system.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. A given data center can have hundreds or thousands of switches interconnected in a distributed fashion. Often, multiple individual switches are grouped into a distributed system. Any one of these switches can leave or join the distributed fabric at any given time, with each such event being a potential disruption to the proper operation of the distributed fabric system.

SUMMARY

In one aspect, the invention features a distributed fabric system comprising a plurality of independent network elements interconnected by inter-switch links and assigned to a same group. Each network element includes one or more switching chips, a processor, and memory storing program code that is executed by the processor. The program code of each network element includes a switch discovery protocol (SDP) module. The SDP module of each network element, when executed, periodically multicasts SDP data units (SDP-DUs) using one of a plurality of transmission rates. The plurality of transmission rates includes a fast transmission rate and a slow transmission rate. The transmission rate used by the SDP module of each network element is the fast transmission rate until the SDP module of that network element determines a criterion is met, in response to which the transmission rate used by the SDP module of that network element changes to the slow transmission rate.

In another aspect, the invention features a computer program product for discovering network elements assigned to a same group in a distributed fabric system. The computer program product comprises a computer-readable storage medium having computer-readable program code embodied therewith. The computer-readable program code comprises a switch discovery protocol (SDP) module configured to periodically multicast SDP data units (SDPDUs) using one of a plurality of transmission rates. The plurality of transmission rates includes a fast transmission rate and a slow transmission rate. The SDP module is further configured to use the fast transmission rate to periodically multicast the SDPDUs until a criterion is satisfied, and, in response to the satisfying of the criterion, to change the transmission rate to the slow transmission rate.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Distributed fabric systems described herein include a plurality of interconnected independent network elements. Each of these network elements includes one or more switching chips for routing packets throughout the distributed fabric. Hereafter, such network elements may interchangeably be referred to as switches. These network elements communicate with each other in accordance with certain protocols. One of the protocols is a switch discovery protocol (SDP), by which the network elements detect when a network element joins or leaves the distributed fabric system. The rapid detection of changes to the membership of the distributed fabric system is important to the proper operation of the distributed fabric system. In addition, the SDP contributes to the process of selecting paths for packets to travel through the distributed fabric system from one network element to another, and, in particular, to the process of selecting a new path quickly when an old path becomes unavailable.

Figure 1:
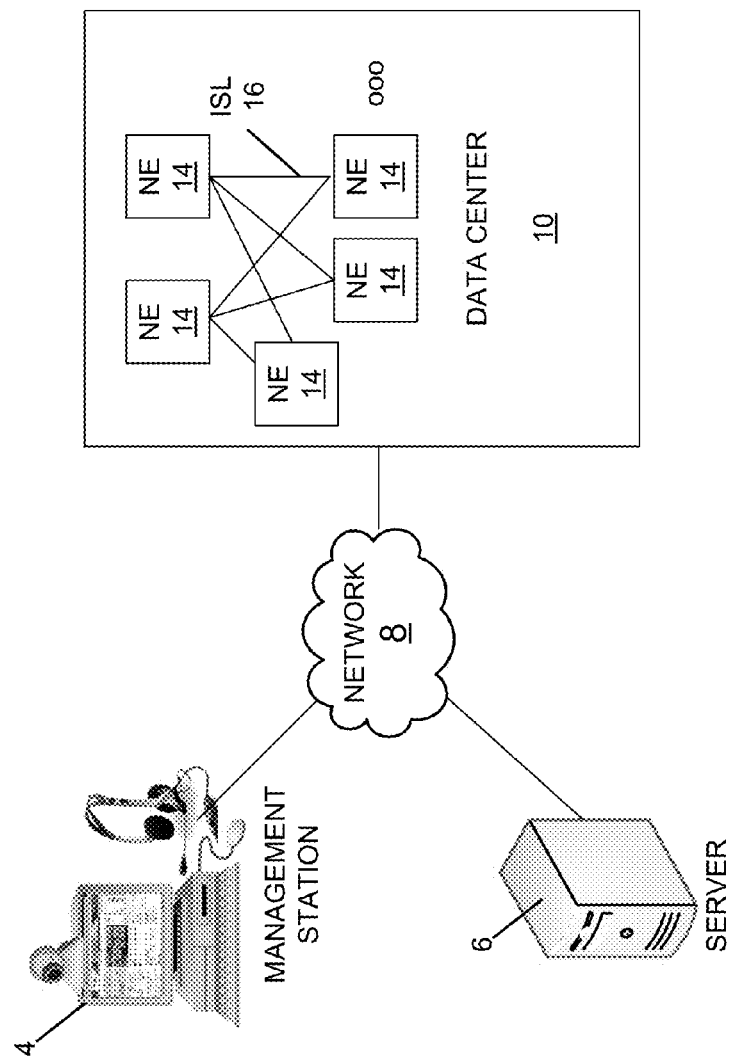
FIG. 1 is an embodiment of a networking environment including a data center with a plurality of network elements, a server, and a management station.

FIG. 1 shows an embodiment of a networking environment 2 including a data center 10 in communication with a management station 4 and a server 6 over a network 8. Embodiments of the network 8 include, but are not limited to, local-area networks (LAN), metro-area networks (MAN), and wide-area networks (WAN), such as the Internet or World Wide Web. In one embodiment, the network 8 is configured as an Layer 2 (L2) VLAN. The data center 10 is generally a facility that houses various computers, routers, switches, and other associated equipment in support of applications and data that are integral to the operation of a business, organization, or other entities.

The data center 10 includes a plurality of network elements 14 in communication over inter-switch links (ISLs) 16. The network elements 14 are independent (standalone) packet-based switches, configured together to form a single distributed fabric system, each designated as a member of a particular group (or cluster). Each group has a master (or controller) network element, one or more standby or back-up network elements, and one or more follower network elements, as described in more detail in connection with FIG. 2. The data center 10 can have more than one group, although each network element can be the member of one group only. Members of the same group share the same group ID (GID). Embodiments of the network elements 14 include, but are not limited to, core switches, access switches, fabric cards, line cards, and management modules in a physical chassis switch. Although only five network elements 14 are shown, the number of network elements in the distributed fabric system can range in the hundreds and thousands.

The data center 10 may be embodied at a single site or distributed among multiple sites. Although shown outside of the data center 10, either (or both) of the management station 4 and server 6 may be considered part of the data center 10. In the data center 10, the functionality occurs on three planes: a management plane, a control plane, and a data plane. The management of the group, such as configuration management, runtime configuration management, presentation of information (show and display), graph generation, and handling SNMP requests, occurs on the management plane. The control plane is associated with those functions involving network signaling and control. The data plane manages data flow. In the data center 10, the functionality of the management plane is centrally implemented at a master network element, as described further herein. The functionality of the control plane may be implemented predominately at the server 6 or be distributed among the network elements. In general, the functionality of the data plane is distributed among the network elements 14.

The management station 4 provides a centralized point of administration for managing and controlling the networked switches 14 of the distributed fabric system. Through the management station 4, a user or network administrator of the data center 10 communicates with the master network element in order to manage the group, with conceivably thousands of network elements, from a single location. A graphical user interface (GUI) application executing on the management station 4 can serve to provide the network administrator with a view of the entire network topology of the distributed fabric system. An example of such a GUI application is Blade Harmony Manager® provided by IBM Corporation of Armonk, N.Y.

In addition, the management station 4 can connect directly (point-to-point) or indirectly to the master network element 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11 (n)). Using a network protocol, such as Telnet or SNMP (Simple Network Management Protocol), the management station 4 can access a command-line interface (CLI) of the given network element 14.

In general, the server 6 is a computer (or group of computers) that provides one or more services to the data center 10, examples of which include, but are not limited to, email servers, proxy servers, DNS servers, and a control server running the control plane of the distributed fabric system. To support the control plane functionality of an entire network element cluster, the server 6 is configured with sufficient processing power (e.g., with multiple processor cores).

Figure 2:
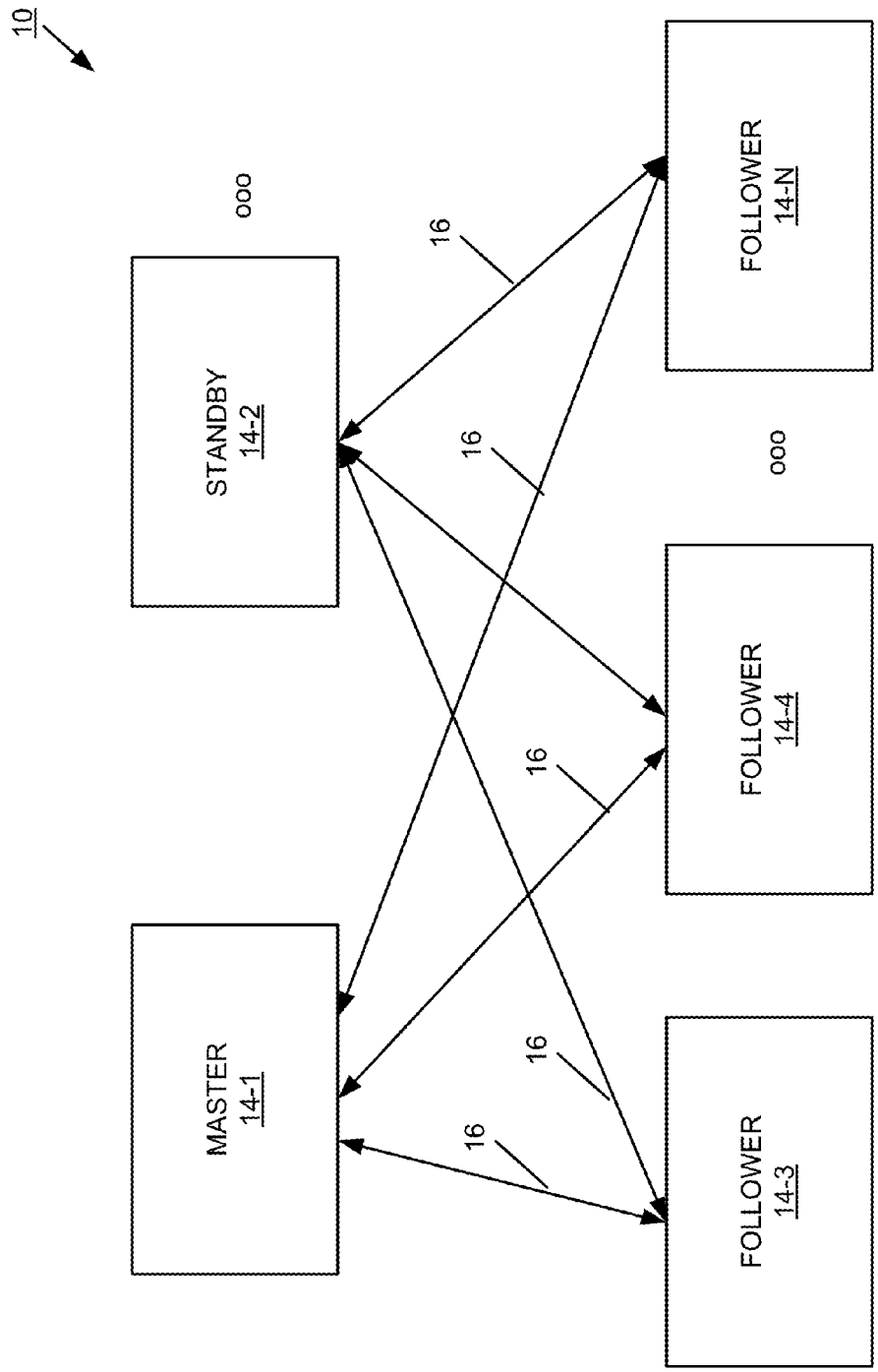
FIG. 2 is a block diagram of an embodiment of the data center including a master (controller) switch, a back-up switch, and a plurality of follower switch.

FIG. 2 shows an embodiment of the data center 10 with the plurality of network elements 14 including a master (controller) switch 14-1, a backup (standby) switch 14-2, and a plurality of follower switches 14-3, 14-4, 14-N. In general, one of the network elements is chosen as the master switch 14-1, another is designated as the backup switch 14-2, and all other switches are followers. The master switch 14-1 is the control center for the entire distributed fabric system and the follower switch is any network element under the control of the master switch 14-1, the master switch 14-1 sending and receiving control plane and data plane packets to and from the follower switches 14-3, 14-4, 14-N. Under normal operation of the distributed fabric system, the backup switch 14-2 operates like a follower switch, except that the backup switch 14-2 assumes the role of master switch in the event the master switch fails. Unless specifically excluded, a reference hereafter to a follower switch includes the backup switch.

The master switch 14-1 and backup switch 14-2 are each in communication with each of the follower switches 14-3, 14-4, 14-N over ISLs 16. Other interconnection configurations can be employed, such as daisy chain, full mesh, star, and stacked, without departing from the principles described herein. In one embodiment, the ISLs 16 over which the network elements 14 communicate are 10 Gb Ethernet links (the network elements 14 communicating according to the IEEE 802.Qgb standard).

Applications in such a distributed fabric system preferably have three modes: a master mode, a backup mode, and a member mode. Depending upon the role of a given network element, applications running on that network element run in the corresponding mode. For example, applications running on the master switch 14-1 run in the master mode. Each application can take a different approach and, thus, take different responsibilities in the different modes. Example implementations of these applications include a purely centralized approach, a fully distributed approach, or a combination of centralized and distributed approaches. Applications running on a network element have a global view of all the data ports on all network elements in the distributed fabric system.

Figure 3:
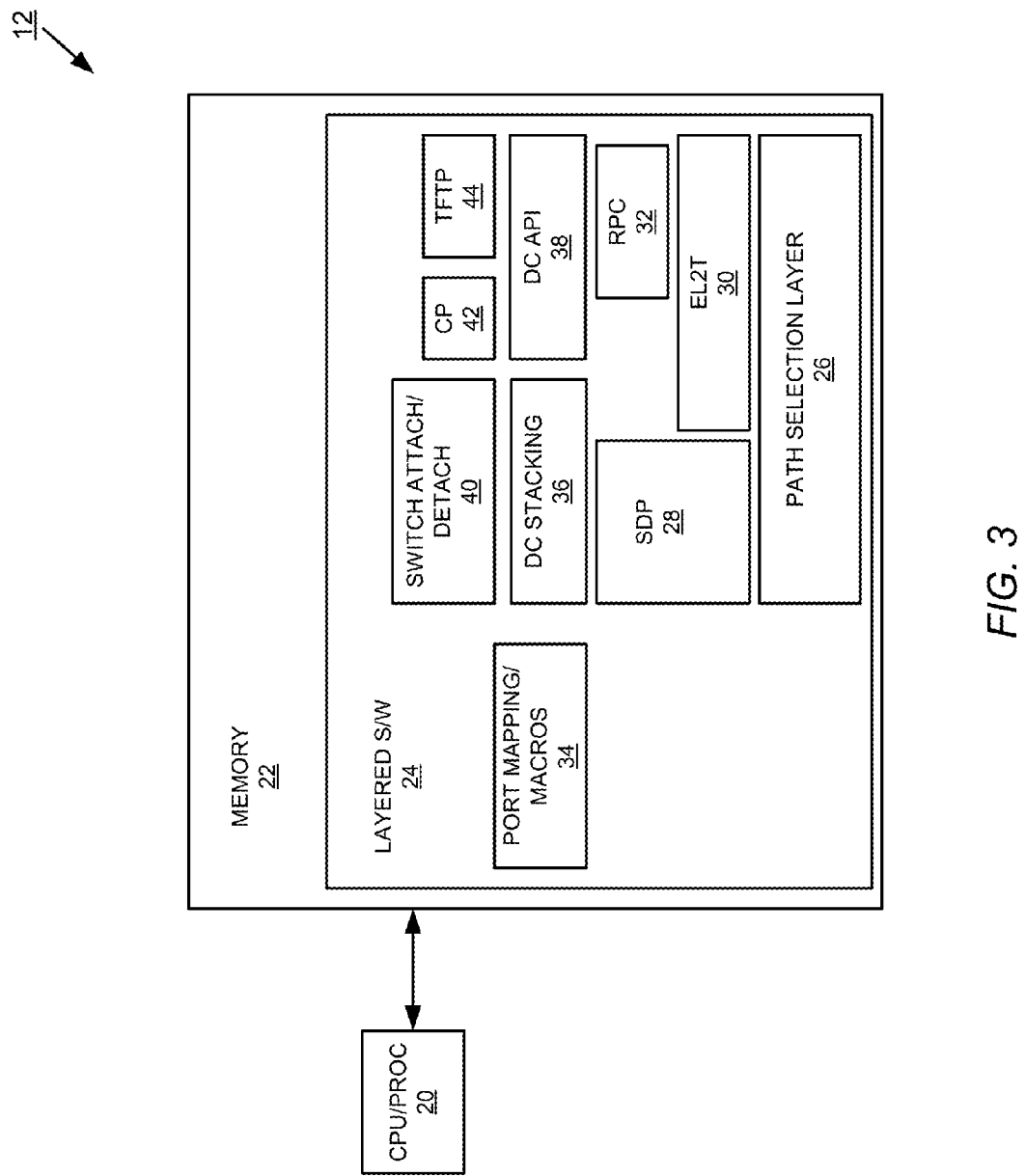
FIG. 3 is a functional block diagram of an embodiment of a network element including a processor in communication with memory, and a layered software stack stored in the memory.

FIG. 3 shows a simplified embodiment of a network element 14 including a processor 20 in communication with memory 22, and layered software 24 stored in the memory 22. The layered software 24 includes a set of software components common to each of the network elements 14. In brief, the set of software components includes protocols for grouping the multiple network elements 14 together to form a single large switch. By implementing the protocols provided by this set of software components, referred to herein as M-DFP or Management Distributed Fabric Protocol, the group of network elements can be connected to form a stacked switch, a virtual switch, or a distributed chassis switch. This set of software components can also serve to implement a physical chassis switch. In general, the M-DFP software components reside in the software stack 24 between those applications on a network element and the SDK (software development kit) on a system. An SDK includes runtime tools, such as the Linux kernel, development tools, software libraries, and frameworks.

The layered software stack 24 includes a path selection layer 26, a switch discovery protocol (SDP) module 28, an EL2T (Ethernet-based L2 Transport) layer 30, an RPC (Remote Procedure Call) module 32, a port mapping/macros module 34, a DC-stacking module 36, DC APIs (application program interface) 38, a switch attach/detach module 40, a CP (check point) module 42, and a TFTP (Trivial File Transfer Protocol) module 44. The communications required to implement M-DFP among the network elements 14 can run on top of standard Ethernet links, a fabric connection, or any proprietary bus.

In brief overview, the path selection layer (PSL) 26 facilitates CPU-to-CPU communications in support of the SDP and EL2T modules 28, 30, and includes a driver interface to both socket and data ports. The SDP module 28 and the PSL 26 cooperate to determine the egress port by which a packet is sent from the local network element to a remote network element. As used herein, the terms "local" and "remote" are with reference to the network element being described.

To determine the egress port, the SDP module 28 maintains the link states for each possible ISL 16. In addition, the SDP module maintains a health record for each remote switch and for each possible path/port. The health record can keep track of the following information: the health state of the path, and the number of SDPDUs received during a current interval. The master switch maintains the health records for all the switches (master and followers). A follower switch maintains the records for the master switch only (in general, follower switches do not communicate with other follower switches).

For normal path selection, the current path is favored if the path has an "up" link state and is healthy. If the current path for a remote network element is no longer healthy or available, the health records serve to choose the next best path. Example criteria for selecting the best path is to find the path with an "up" link state that has had the most SDPDUs received during the most recent period, and which no other modules have reported to be unhealthy. After a new path for a remote network element is determined, the SDP module 28 notifies the PSL 26 of this new path. After a predefined interval, the health records are reset to ensure the information in the health records is current.

The SDP module 28 discovers when network elements join and leave the group, referred to as switch-found and switch-gone events, respectively. Detecting the departure of a network element can be achieved using an age-out mechanism. Link-down events on the ISLs 16 can also trigger switch-gone detection under some conditions. The SDP module 28 reports switch-found (JOIN_STACK) and switch-gone (LEAVE_STACK) events to the DC-stacking module 36 on the same network element for further processing. Other functions of the SDP module 28 are to check the health of ISLs 16 for all possible paths between the local network element and other remote network elements, and to provide a priority-based master-election mechanism.

The EL2T layer 30 provides a simple L2 transport protocol to facilitate communications by the upper layer protocols above the EL2T layer 30. In one embodiment, these upper layer protocols include the RPC module 32, the DC-stacking module 36, the CP module 42, the TFTP module 44, and all applications on the network element 14.

The RPC module 32 provides an RPC mechanism that is based on the EL2T layer 30, and used by DC-API layer 38 on the master switch 14-1 to communicate with a remote network element.

The port mapping/macros module 34 provides applications on the top of the layered software with a mapping from a global CLI port to a physical device and a port. In cooperation with the DC-stacking module 36 and the SDP module 28, the port mapping/macros module 34 maintains the mapping.

The DC-stacking module 36 forms a "stack" of the network elements in the same group, coordinating the network elements such that they cooperate as a single switch. The DC-stacking module 36 of all network elements in the same group communicate with each other using the EL2T module 30 for information exchange and for stack formation. In addition, the DC-stacking module 36 on different network elements work together to make sure the master switch 14-1 has up-to-date information for existing network elements (through HOST-UPDATE events). A HOST-UPDATE event is passed to the DC-stacking module 36 to provide an information update whenever the switch information for a given network element has changed and the DC-stacking module 36 has already received a JOIN-STACK event for that given network element.

Through the DC-API layer 38, applications running on the network element 14 can make program calls to the hardware switching chips of the network element, either to retrieve information from the chips or to set some parameters on the chips. These chips may reside either on the local network element or on a remote network element.

The switch attach/detach module 40 notifies applications on the network element of changes on the network element, thus providing applications at the top of the layered software stack 24 with a global view of all data ports on all network elements in the group.

The CP module 42 assists applications running on the master switch 14-1 to synchronize each relevant database and states with the backup switch 14-2 in preparation for a backup-to-master failover.

The TFTP module 44 provides a transport layer on top of the EL2T layer 30 to assist the DC-stacking module 36 and applications to push either a configuration or a firmware image from the master switch 14-1 to any follower switch 14-3, 14-4, 14-N.

Figure 4:
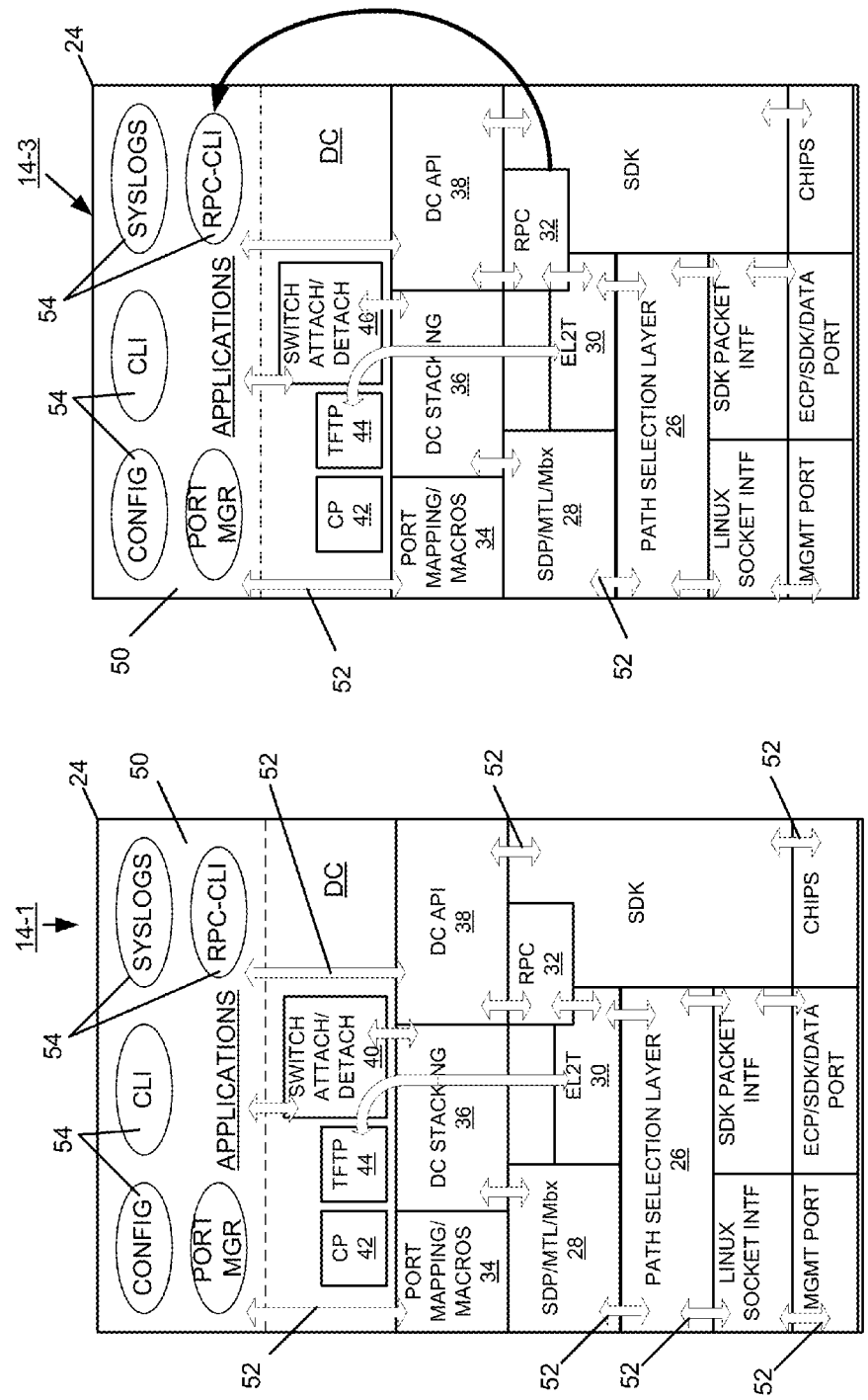
FIG. 4A is a block diagram of the layered software in a master switch and various communication channels between layers of the software stack.
FIG. 4B is a block diagram of the layered software in a follower switch and various communication channels between layers of the software stack.

FIG. 4A and FIG. 4B show software stacks 24 in a master switch 14-1 and in a follower switch 14-3 (as a representative example of the follower switches), respectively. Here, each software stack 24 includes an application layer 50 with various applications 54, examples of which include a config application, a CLI application, and a syslogs application. Double-ended arrows 52 represent control flows between components in the software stack 24.

In the layered software stack 24, the SDP module 28 is disposed between the DC-stacking module 36 above and the path selection layer 26 below. The SDP module 28 includes a switch discovery protocol (SDP), a member tracking layer (MTL), and a Path Health Maintenance (PHM) component. SDP is a multicast protocol, running in a common L2 VLAN, used for the discovery of switches in the distributed fabric system. After a switch receives a packet for SDP, related switch information is passed into the MTL for maintenance of membership.

The MTL is a database layer of the SDP module 28 for tracking the current network element members in the same group and for maintaining switch information for all such members. The switch information for each network element includes: the switch number, the MAC address of the switch, switch information (SI) and switch member (SM) sequence numbers, and a time at which the last SDPDU is received from a remote network element. Any changes to the switch information is reported to MTL for tracking. When an ISL 16 goes down, the switch information learned over that link is cleared in the MTL. To help detect a switch-gone event, the MTL implements an age-out mechanism, using timers to "age out" a remote network element if no SDPDU is received from that network element for a specified duration.

The MTL also elects the master switch of a group based on switch priorities (carried in the SDPDUs multicast by the network elements). After the election, the elected master switch reports the switch member information to the DC-stacking module 36 of the master switch. In addition, the MTL of the master switch passes a message to the DC-stacking module 36 to notify of any change in switch membership in the group, whether resulting from a newly discovered network element or from detecting the departure of a network element.

The PHM component of the SDP module 28 maintains the health states of all possible paths between the local network element and all other remote network elements. When an SDPDU is received from a network element, the health states for that network element are also updated in the MTL. As previously described, the EL2T 30 and PSL 26 use this health information to determine the path or port used for communication between the local network element and a remote network element.

After booting up, a local network element periodically transmits "SDP Hello" frames (i.e., PDUs) over the ISLs 16 to announce its presence to all other peers in the same VLAN. In response to receiving an "SDP Hello" PDU, each network element collects and maintains the switch information in its local database (i.e., the MTL). After the network elements collect enough switch information, the SDP module 28 of each network element elects a master switch based on switch priorities (all network elements elect the same master switch). The SDP module 28 of each network element passes its collected switch information in an appropriate manner to the DC-stacking module 36 on that same network element; if the network element is the master switch for the group, the switch information is used for stack coordination and formation.

Figure 5:
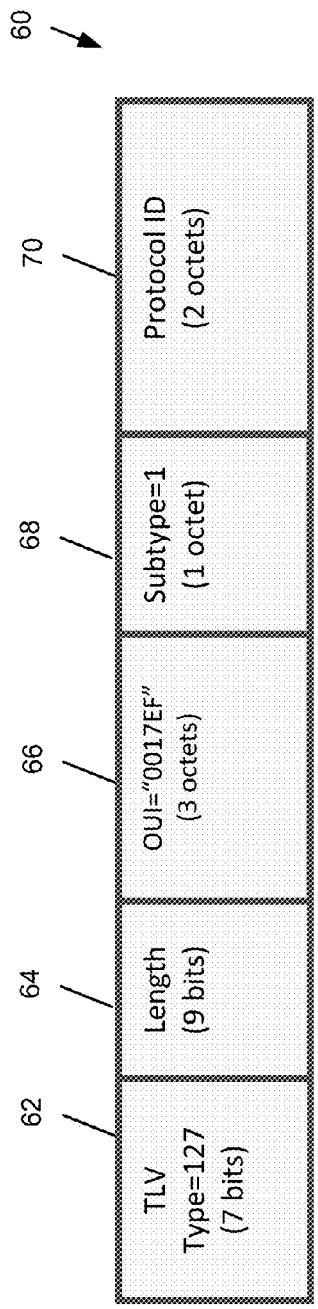
FIG. 5 is a diagram of an embodiment of a Protocol TLV (type-length-value).

Packets issued by the SDP module 28 are called switch data protocol data units (SDPDUs). Generally, an SDPDU is a TLV-based PDU (protocol data unit). SDPDUs use four types of TLVs: a Protocol TLV, a Group-ID (GID) TLV, Switch-Info (SI) TLV, and a Switch-Members (SM) TLV. FIG. 5 shows an embodiment of a Protocol TLV 60 including a type field 62, a length field 64, an OUI (Organization Unique Identifier) field 66, a subtype field 68, and a protocol ID field 70. The Protocol TLV 60 serves to identify the frame type of a PDU. The type field 62 identifies the start of a TLV (e.g., value=127); the length field 64 indicates the bit length of the Protocol TLV; the OUI field 66 holds a proprietary company ID; the subtype field 68 holds a value (here, equal to 1) that identifies the type of the TLV (here, denoting a Protocol TLV); and the protocol ID field 70 identifies the protocol (e.g., Ethernet).

Figure 6:
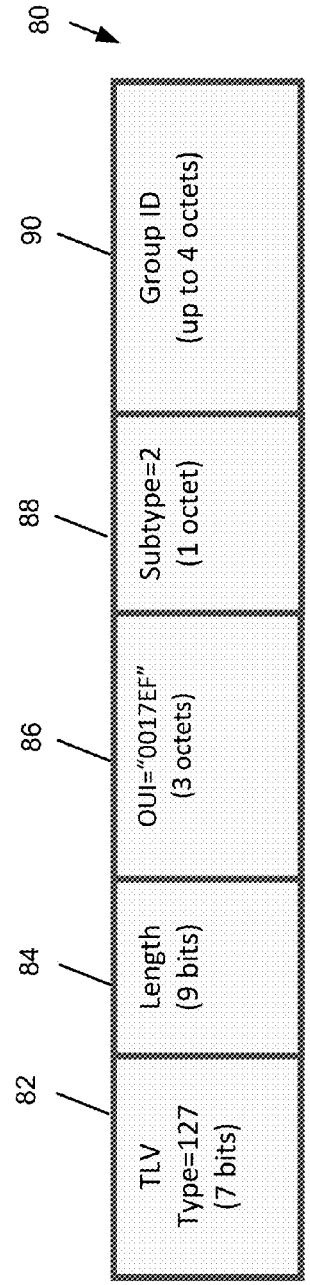
FIG. 6 is a diagram of an embodiment of a Group ID (GID) TLV.

FIG. 6 shows an embodiment of the GID TLV 80, which is used for group identification. Multiple network elements in the same VLAN may belong to different groups and, thus, to different virtual switches (or virtual chasses). The GID TLV 80 includes a type field 82, a length field 84, an OUI field 86, a subtype field 88, and a group ID field 90. The value in the type field 82 identifies the start of a TLV (e.g., value=127); the length field 84 indicates the bit length of the TLV; the OUI field 86 holds a company ID; the subtype field 88 holds a value of 2 to indicate this TLV is a GID TLV 80; and the group ID 90 identifies the group of network elements to which the transmitting network element belongs.

Figure 7:
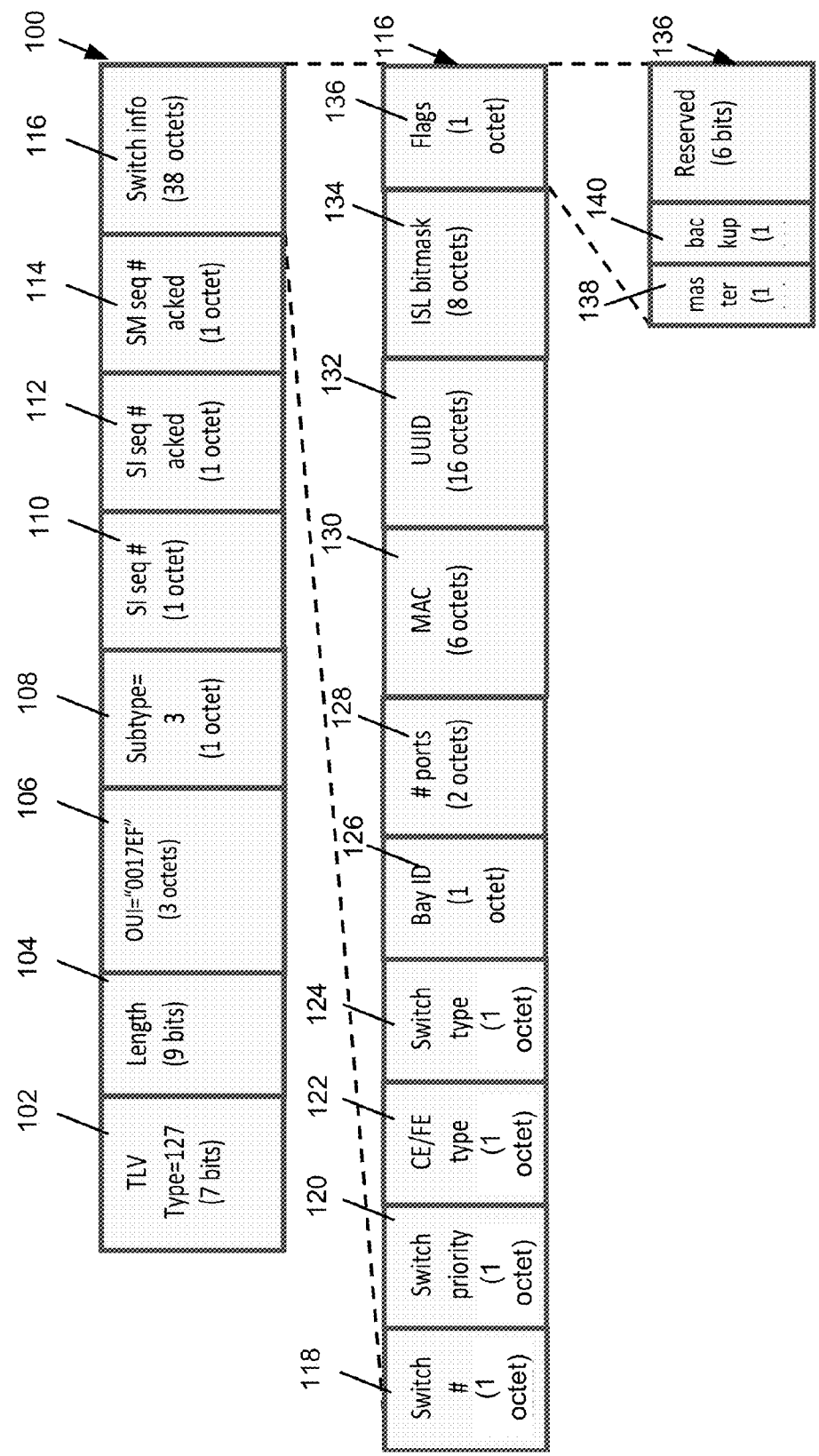
FIG. 7 is a diagram of an embodiment of a Switch-Info (SI) TLV.

FIG. 7 shows an embodiment of the Switch-Info (SI) TLV 100. The SI TLV 100 is used to advertise the switch information of the local network element and includes a type field 102, a length field 104, an OUI field 106, a subtype field 108, an SI sequence number field 110, an SI sequence number acknowledged field 112, an SM sequence number acknowledged field 114, and a field 116 for carrying switch information. The roles of the type field 102, length field 104, and OUI field 106 are similar to those of the Protocol TLV 60 and GID TLV 80. A value of 3 in the subtype field 108 identifies the type of this TLV as the SI TLV 100.

The SI sequence number field 110 holds the sequence number of this particular TLV. The sequence number increments by one in response to any change in the switch information in the TLV (exceptions to this being that changes to the acknowledged SI or SM sequence numbers in the fields 112, 114 do not result in incrementing the SI sequence number). In one embodiment, the sequence number 0 is used to denote an invalid SI; that usually indicates no SI received of updated before. An SDPDU with a valid SI should never use the SI sequence number 0. The SI sequence number acknowledged field 112 holds the last sequence number of a Switch-Info TLV sent by the local network element and acknowledged by the master switch. This value is set to 0 if sent by the master switch. The master does not use the SI sequence number acknowledged field 112 to acknowledge the SI received from a member. Instead, the master uses the SI sequence number field 172 for acknowledgements. Usually the system has more than one member. The SI sequence number acknowledged field 112 is used by a member switch to acknowledge the SI received from the master. The SM sequence number acknowledged field 114 holds the last sequence number of a Switch-Members TLV received from the master switch. This field 114 is used by member switches only and is set to 0 if sent by the master switch.

The switch information field 116 includes fields for a switch number 118, switch priority 120, CE/FE (control element/forwarding element) type 122, switch type 124, bay ID 126, number of ports 128, MAC address 130, UUID 132, ISL bitmask 134, and flags 136. The switch number field 118 holds a switch number that is set by the transmitting network element. The switch priority field 120 holds a switch priority of the transmitting network element, which can be used to elect the master switch. The CE/FE type field 122 identifies the type of the switch as a control element (CE), forwarding element (FE), or both. The switch type 124 identifies the switch type of the transmitting network element. Switch type is the type of the switch; the type determines the port configuration and port type of a switch. CE denotes the control element; FE denotes the forwarding elements; only a CE can be the master or the backup controller in a distributed system. The bay ID 126 can identify the physical location of the network element within a physical chassis. The number of ports 128 identifies the number of ports, the MAC address 130 holds the MAC address, the UUID field 132 holds the UUID, and the ISL bitmask field 134 holds the bitmask of the local ISL ports, all with respect to the transmitting network element.

The flags field 136 has a one-bit field 138 for the transmitting network element to signify that it is the master switch and a one-bit field 140 for the transmitting network element to signify that it is the backup switch.

Figure 8:
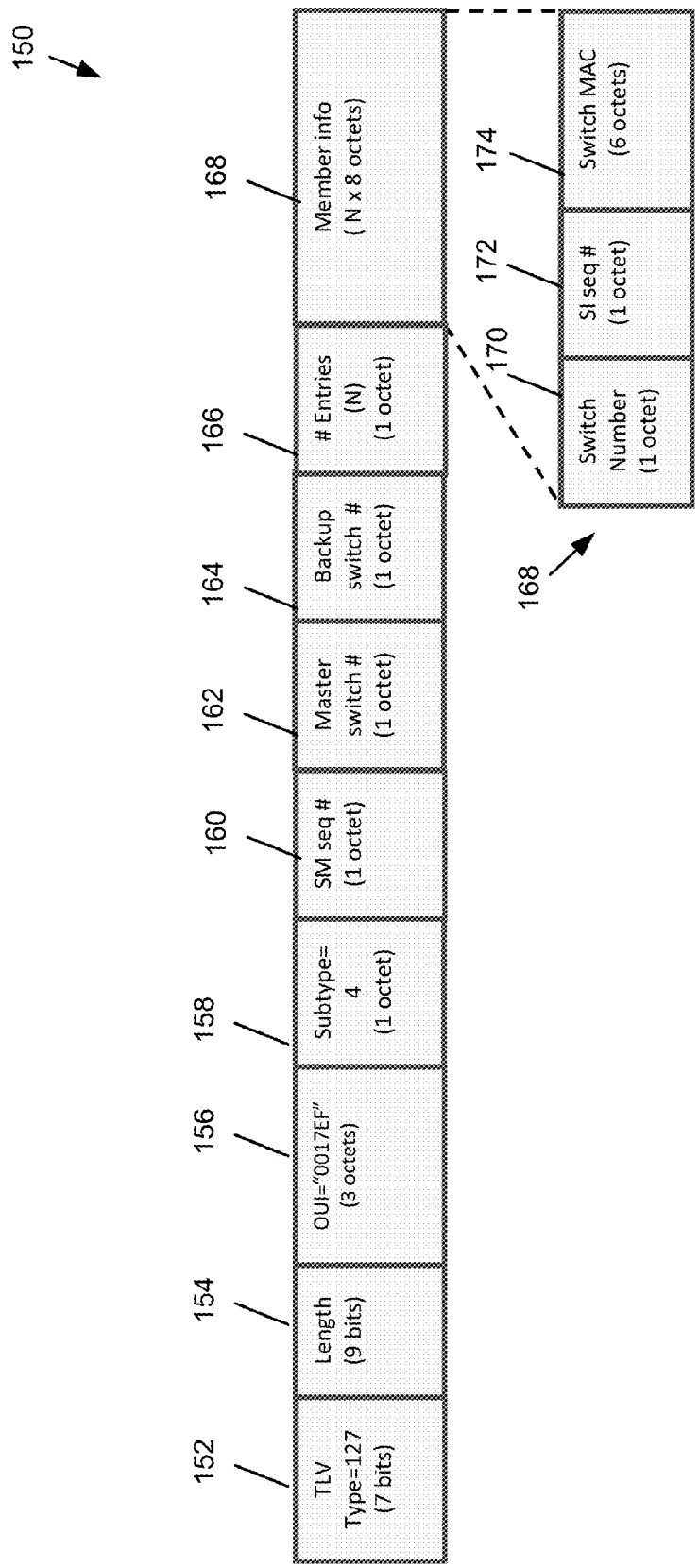
FIG. 8 is a diagram of an embodiment of a Switch-Members (SM) TLV.

FIG. 8 shows an embodiment of a Switch-Members (SM) TLV 150 (transmitted by the master switch only). The master switch uses the SM TLV 150 to notify the follower switches of all the member information that the master switch has collected for the same group of network elements. The SM TLV 150 includes a type field 152, a length field 154, an OUI field 156, a subtype field 158, an SM sequence number field 160, a master switch number field 162, a backup switch number field 164, a field 166 identifying a number of entries carried by the SM TLV, and a field 168 for carrying the membership information. Each entry in the membership information field 168 includes a switch number field 170, a SI sequence number field 172, and a switch MAC address 174.

The roles of the type field 152, length field 154, and OUI field 156 are similar to those of the Protocol TLV 60, GID TLV 80, and SI TLV 100. A value of 4 in the subtype field 158 identifies the type of the TLV as the SM TLV 150. The SM sequence number field 160 holds the sequence number of this particular SM TLV. The sequence number increments by one in response to any change in the SM TLV. The Sequence number 0 is denotes an invalid SM TLV; either not received or not updated. An SDPDU with a valid SM does not use sequence number 0 in the SM sequence number field. The master switch number field 162 holds the switch number of the CE-master switch. The value is equal to 0 if the master switch is not assigned yet. The backup switch number field 164 holds the switch number of the backup switch. The value is equal to 0 if the backup switch is not yet assigned yet. Field 166 holds the number (N) of entries carried by the SM TLV 150. Each switch member entry includes the switch number of the member (0, is not yet assigned), the SI sequence number of the last Switch-Info TLV received from that member switch, and the switch MAC address of that member switch.

All network elements multicast SDPDUs periodically. For the master switch, an SDPDU includes the following TLVs: a Protocol TLV 60, a GID TLV 80, a Switch-Info TLV 100, and Switch-Members TLV 150. For all follower switches, each SDPDU includes: a Protocol TLV 60, GID TLV 80, and a switch-info TLV 100. The packet format of an SDPDU includes an ECP (Edge Control Protocol) header (e.g., Ethertype), followed by the Protocol TLV 60, the GID TLV 80, the SI TLV 100, and, in the case of the master switch, by the SM TLV 150. ECP is a protocol defined in 802.1Qbg for PDU transport needed by the VDP protocol.

Figure 9:
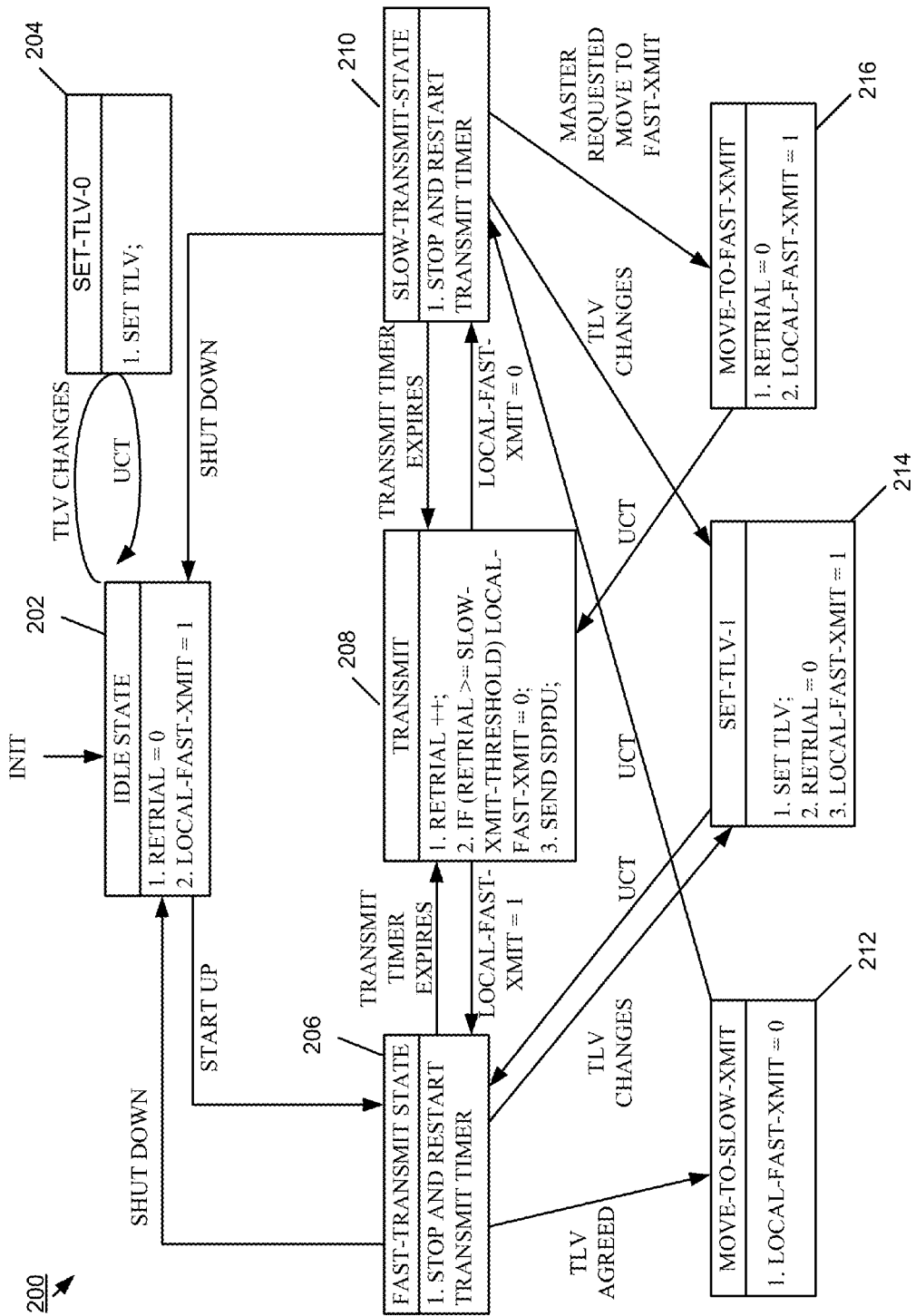
FIG. 9 is a diagram of an embodiment of a transmit state machine (TSM) for the switch discovery protocol.

In the processing of SDPDUs, the SDP module 28 has two state machines: a Transmit State Machine (TSM) 200 and a Receive State Machine (RSM) 250. FIG. 9 shows an embodiment of the TSM 200 for the SDP. The TSM 200 controls a process by which the network elements issue SDPDUs. The transmission of SDPDUs can occur in two different modes: a fast-transmit mode and a slow-transmit mode; the fast-transmit mode has a faster transmission rate than the slow-transmit mode. An objective of the TSM 200 is to reduce CPU overhead used to run the SDP when the distributed fabric system (i.e., all the network elements and related ISLs) have become stable by entering the slow-transmit mode, and to speed up switch discovery in response to any detected change by entering the fast-transmit mode. The retransmission rate of SDPDUs slows down after the master switch and follower switches have successfully exchanged the current switch information of all members in the group. The retransmission rate can also slow down whenever the master switch or follower switches has no further changes for its transmitted SDPDUs.

The TSM 200 enters the fast-transmit mode when: (1) the network element starts up, (2) a TLV changes (e.g., master, backup, or follower changes; or, switch information ages out), (3) the master has set the acknowledged SI sequence number in the Switch-Members TLV to 0 (a mechanism used by the master switch to request a response from a remote network element immediately), (4) the current multicast path fails (required for SMAC learning), and (5) when a master failover occurs. For example, in the event of a master switch failure, the backup switch assumes the role of the new master switch. The other switches eventually detect this change and discard all the switch information learned from the old master switch (gained through the Switch-Members TLV 150). This "TLV changes" event prompts all switches to enter the fast-transmit mode. As another example, a change in a remote Switch-Info TLV 100 triggers a change of the Switch-Members TLV on the master switch. Thus, the joining of a new switch prompts the master switch to enter the fast-transmit mode. The entering of the master switch into the fast-transmit mode, however, does not trigger a follower switch to enter the fast-transmit mode.

The TSM 200 includes an idle state 202, a set-TLV-to-0 state 204, a fast-transmit state 206, a transmit state 208, a slow-transmit state 210, a move-to-slow-transmit state 212, a set-TLV-to-1 state 214, and a move-to-fast-transmit state 216. Three states are considered stable states: the idle state 202; the fast-transmit state 206, in which the SDPDU is transmitted at the fast transmission rate; and the slow-transmit state 210, in which the SDPDU is transmitted at a slow transmission rate. One transmit timer with two settings can be used to implement two transmission rates: one setting for the fast-transmit mode (e.g., 1-second intervals), and the second setting for the slow-transmit mode (e.g., 30-second intervals).

Transitions from state-to-state are influenced by the values of certain variables maintained by the TSM 200. In one embodiment, the variables are called "RETRIAL" and "LOCAL-FAST-XMIT". The RETRIAL variable contains the number of transmittals for the last SDPDU (in other words, consecutive transmissions of an unchanged SDPDU, which signifies converging stability). The LOCAL-FAST-XMIT variable is a Boolean for denoting if the TSM 200 is currently in the fast-transmit mode. The values of certain parameters also affect the operation of the TSM 200. In one embodiment, the parameters are called "FAST-XMIT-INTERVAL", "SLOW-XMIT-INTERVAL", and "SLOW-XMIT-THRESHOLD". The value of the FAST-XMIT-INTERVAL parameter controls the transmit timer in the fast-transmit mode. A default value sets the transmit timer to 1 second. If the value is equal to 0, no SDPDU transmission occurs. The value of the SLOW-XMIT-INTERVAL parameter controls the transmit timer in the slow-transmit mode. A default value sets the transmit timer to 30 seconds. If the value is equal to 0, no SDPDU transmission occurs. The SLOW-XMIT-THRESHOLD parameter controls when the TSM transitions to the slow transmit mode, namely, when the RETRIAL variable exceeds this threshold value, signifying a given number of consecutive transmissions of the same SDPDU. For the master switch, the default threshold is 10; for follower switches, the default threshold is five.

Six events can trigger a state transition in the TSM 200: the network element starts up; the network element shuts down; a TLV changes; a timer expires; the master switch requests a move to the fast-transmit mode (accordingly, this event can occur only on a follower switch); and a "TLV agreed" event (triggered by the RSM 250). The TSM 200 enters the slow-transmit mode when a TLV agreed event occurs. A TLV agreed event signifies: 1) for the master switch, that the local sequence numbers (both SI and SM) have been acknowledged by all the follower switches, and the master switch encounters no changes in the remote SI sequence numbers received from all follower switches; and 2) for each follower switch, that its local SI sequence number has been acknowledged by the master switch, and the follower switch encounters no change in the sequence numbers (both SI and SM) received from the master switch. For a TLV agreed event to be valid, the sequence numbers cannot be equal to 0.

A network element enters the idle state 202 when it initializes and when it shuts down. While in the idle state 202, the RETRIAL variable is set equal to 0 and the LOCAL-FAST-XMIT variable is set equal to 1. If, while in the idle state 202, a TLV changes, the TSM 200 transitions to the Set-TLV-to-0 state 204. A TLV change means that the network element is making a modification to any one of the TLVs in its next SDPDU. In the Set-TLV-to-0 state 204, the TSM 200 makes the TLV change, and upon completion (UCT) returns to the idle state 202. When the TLVs are stable (i.e., no TLV changes), the TSM 200 transitions from the idle state 202 to the fast-transmit state 206.

In response to the transition to the fast-transmit state 206, the transmit timer stops and restarts. When the transmit timer expires, the TSM transitions to the transmit state 208. In the transmit state 208, the RETRIAL variable is incremented. If the resulting value of the RETRIAL variable exceeds the SLOW-XMIT-THRESHOLD value, the LOCAL-FAST-XMIT variable is set equal to 0, and the network element transmits the SDPDU. If, after transmitting the SDPDU, the value of the LOCAL-FAST-TRANSMIT variable is equal to one, the TSM 200 returns to the fast transmit state 206; if equal to zero, the TSM 200 transitions to the slow transmit state 210. When the value of the RETRIAL variable exceeds the SLOW-XMIT-THRESHOLD value (signifying the number of transmittals of an unchanged SDPDU has exceeded a specified threshold), the network element enters the slow-transmit mode, to slow down the transmission of SDPDUs because all peer network elements have no more changes to make.

If, while in the fast transmit state 206, a TLV agreed event occurs before the transmit timer expires, the TSM 200 transitions to the move-to-slow transmit state 212; or if a TLV changes event occurs before the transmit timer expires, the TSM 200 transitions to the set-TLV-to-1 state 214. In the move-to-slow transmit state 212, the LOCAL-FAST-XMIT variable is set equal to 0, and the TSM 200 transitions to the slow-transmit state 210 upon completion (UCT). In the set-TLV-to-1 state 214, the TLV change is made, the RETRIAL variable is set equal to 0 and the LOCAL-FAST-XMIT variable is set equal to 1. Upon completion of these settings, the TSM 200 returns to the fast transmit state 206.

In response to the transition to the slow transmit state 210, the transmit timer stops and restarts, and runs according to the slow transmission rate. When the transmit timer expires, the TSM 200 transitions to the transmit state 208. If, while in the slow transmit state 210, the master switch requests a faster transmit rate before the transmit timer expires, the TSM 200 transitions to the move-to-fast transmit state 216; or if a TLV changes event occurs before the transmit timer expires, the TSM 200 transitions to the set-TLV-to-1 state 214. In the move-to-fast transmit state 216, the RETRIAL variable is reset (set equal to 0) and the LOCAL-FAST-XMIT variable is set equal to 1, and the TSM 200 transitions to the Transmit state 208 upon completion (UCT). Again, in the set-TLV-to-1 state 214, the TLV is set, the RETRIAL variable is reset equal to 0, the LOCAL-FAST-XMIT variable is set equal to 1, and, upon the completion of these settings, the TSM 200 returns to the fast-transmit state 206.

In general, the SDP is used primarily to discover a new switch, and, as previously described, the MTL implements an age out mechanism to detect when a switch leaves the distributed fabric system. The age-out mechanism is implemented in the master switch and in the other switches. The master switch runs a timer to "age out" a SI sequence number of a remote switch in its Switch-Members TLV, if the related Switch-Info TLV has not been received for a specified period (e.g., 100 seconds). When this SI sequence number ages out, the master switch triggers a TLV change and, as a consequence, enters the fast-transmit mode. In the fast transmit mode, an information exchange occurs immediately between the master switch and a specific remote switch, which can thus avoid triggering an unnecessary switch-gone event if the aging out is caused, for example, by dropping related SDPDUs on the wire for unknown reasons.

All network elements implement another timer to remove the switch information for a remote switch if the Switch-Info TLV of that remote switch has not been received for a specified period (e.g., 120 seconds). When this occurs, a switch-gone event is detected and the MTL of the SDP module is notified. When notified by the PSL 26, or other modules, that a switch is gone, the switch information learned for that switch is cleared from the MTL (or marked "unavailable"). For instance, other modules can signal a path failure (i.e., a path is unhealthy) under the following situations: a link down, packet loss detected by protocols such as PSL/EL2T/RPC, etc.

Two parameters for implementing the age-out mechanisms include an SI-AGE-OUT-INTERVAL and a SWITCH-AGE-OUT-INTERVAL. The value held by the SI-AGE-OUT-INTERVAL parameter is the time interval for aging out a SI sequence number of a remote switch in the Switch-Members TLV. Its default value can be, for example, 100 seconds. If the value is set equal to 0, then the aging mechanism is disabled. The value held by the SWITCH-AGE-OUT-INTERVAL parameter is the time interval to age out the switch information of a remote switch. Its default value can be, for example, 120 seconds. If the value is set equal to 0, then this aging mechanism is disabled.

In one embodiment, the TSM 200 is not permitted to enter the slow-transmit mode if the only method for detecting a switch-gone event is by the aging mechanism; this ensures that the aging mechanism uses the faster timer rate for detecting a switch-gone event.

Figure 10:
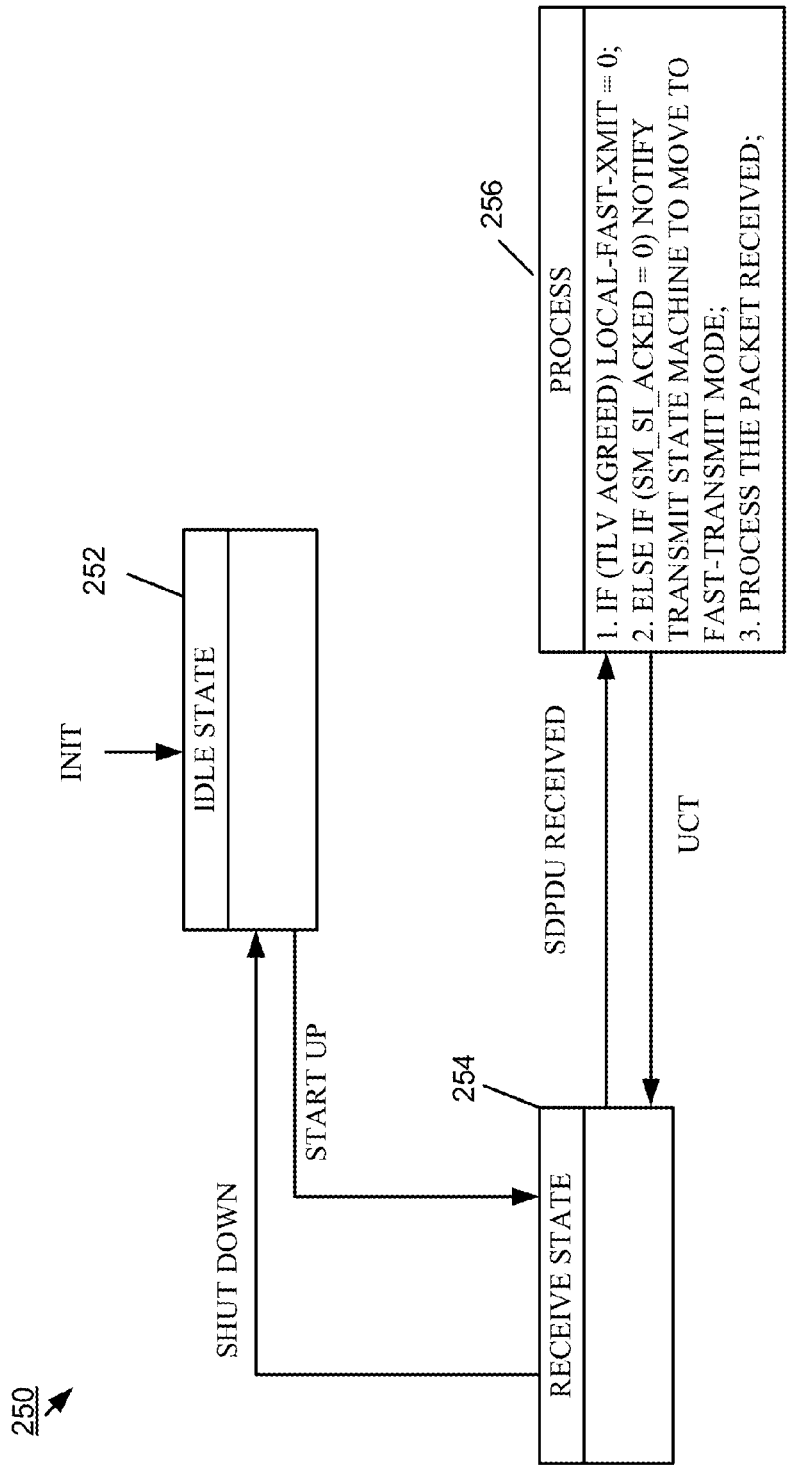
FIG. 10 is a diagram of an embodiment of a receive state machine (RSM) for the switch discovery protocol.

FIG. 10 shows an embodiment of the RSM 250 for the SDP. The RSM 250 controls the processing of SDPDUs received by a network element. The RSM 250 includes an idle state 252, a Receive state 254, and a Process state 256. The idle state 252 and Receive states 254 are considered stable states. Three events can trigger a state transition in the RSM 200: start-up, shut-down, and an SDPDU received.

A network element enters the idle state 252 when it initializes (starts up) and when it shuts down. From in the idle state 252, the RSM 200 transitions to the Receive state 254. The RSM 250 remains in the Receive state 254 until a SDPDU is received (or the network element powers down). In response to receiving an SDPDU, the RSM 250 transitions to the Process state 256. In the Process state 256, a follower switch processes both the Switch-Info TLVs received in an SDPDU and the Switch-Members TLVs received from the master switch. The master switch, in contrast, processes the received Switch-Info TLVs (i.e., not Switch-Members TLVs).

In addition, if a TLV agreed event occurs while in the Process state 256, the LOCAL-FAST-XMIT variable is set equal to 0. As previously described, after the master switch and follower switches have received stabilized current information in Switch-Info and Switch-Members TLVs, the RSM 250 triggers the TSM 200 to enter the slow-transmit mode. The master switch, however, can trigger the TSM 200 of a network element to enter the fast-transmit mode by setting the corresponding SI sequence number of that network element in the Switch-Members TLV to 0.

In addition, in the Process state 256, if the SM.SI_ACKed (i.e., field 172 in the SM) is equal to zero, the RSM 250 notifies the TSM 200 to move to the fast-transmit state 206. The master switch can use this mechanism to cause the network element to return to the fast-transmit mode. The network element also processes the SDPDU packet, with the RSM 250 transitioning back to the Receive state 254 upon completion.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A distributed fabric system comprising:
a plurality of independent network elements interconnected by inter-switch links and assigned to a same group, each network element including one or more switching chips, a processor, and memory storing program code that is executed by the processor, the program code of each network element including a switch discovery protocol (SDP) module, the SDP module of each network element, when executed, periodically multicasting SDP data units (SDPDUs) using one of a plurality of transmission rates, the plurality of transmission rates including a fast transmission rate and a slow transmission rate, the transmission rate used by the SDP module of each network element being the fast transmission rate until the SDP module of that network element detects stability among all of the network elements in the same group, in response to which the transmission rate used by the SDP module of that network element changes to the slow transmission rate, wherein a criterion for detecting stability is that a number of consecutive transmissions of an unchanged SDPDU by the SDP module of that network element exceeds a threshold.

2. The distributed fabric system of claim 1, wherein the plurality of network elements includes a master network element, and wherein stability among all of the network elements in the same group is detected when information exchanged between the SDP module of that network element and the master network element has stabilized.

3. The distributed fabric system of claim 1, wherein one or more of the network elements detects, in response to a received SDPDU, a change among the network elements in the same group and returns to transmitting SDPDUs at the fast transmission rate.

4. The distributed fabric system of claim 1, wherein the SDP module of each network element includes a member tracking layer (MTL) component, the MTL component electing one of the network elements as a master network element for the group.

5. The distributed fabric system of claim 4, wherein each SDPDU includes a protocol TLV, a group ID (GID) TLV, and a switch information (SI) TLV and each SDPDU transmitted by the master network element further includes a switch-members (SM) TLV.

6. The distributed fabric system of claim 4, wherein the MTL component of the SDP module of each network element maintains a database containing a current membership of the group.

7. The distributed fabric system of claim 4, wherein the MTL component of the SDP module of each network element employs an age out mechanism to determine whether a network element has left the distributed fabric system.

8. The distributed fabric system of claim 1, wherein the SDP module of each network element includes a path health maintenance (PHM) component, the PHM component of the SDP module of each network element maintaining health states of all possible paths between that network element and all other network elements for determining a path to be used for communication between that network element and each of the other network elements.

9. A computer program product for discovering network elements assigned to a same group in a distributed fabric system, the computer program product comprising:
a non-transitory computer-readable storage medium having computer-readable program code embodied therewith, the computer-readable program code comprising:
a switch discovery protocol (SDP) module configured to periodically multicast SDP data units (SDPDUs) using one of a plurality of transmission rates, the plurality of transmission rates including a fast transmission rate and a slow transmission rate, the SDP module being further configured to use the fast transmission rate to periodically multicast the SDPDUs until stability among all of the network elements in the same group is detected, and, in response to the detection of stability, changing the transmission rate to the slow transmission rate, wherein a criterion for detecting stability is that a number of consecutive transmissions of an unchanged SDPDU by the SDP module exceeds a threshold.

10. The computer program product of claim 9, wherein the plurality of network elements includes a master network element, and wherein stability among all of the network elements in the same group is detected when information exchanged between the SDP module of that network element and the master network element has stabilized.

11. The computer program product of claim 9, wherein the SDP module is further configured to detect, in response to a received SDPDU, a change among the network elements in the same group and to return to transmitting SDPDUs at the fast transmission rate.

12. The computer program product of claim 9, wherein the SDP module further includes a member tracking layer (MTL) component configured to elect one of the network elements as a master network element for the group.

13. The computer program product of claim 12, wherein each SDPDU includes a protocol TLV, a group ID (GID) TLV, and a switch information (SI) TLV and each SDPDU transmitted by the master network element further includes a switch-members (SM) TLV.

14. The computer program product of claim 12, wherein the MTL component of the SDP module is further configured to maintain a database containing a current membership of the group.

15. The computer program product of claim 12, wherein the MTL component of the SDP module is further configured to implement an age out mechanism to determine whether a network element has left the distributed fabric system.

16. The computer program product of claim 12, wherein the SDP module of each network element further includes a path health maintenance (PHM) component configured to maintain health states of all possible paths between a given network element and all other network elements in the distributed fabric system for determining a path to be used for communication between that given network element and each of the other network elements.

\* \* \* \* \*